US006827310B1

(12) United States Patent
Whitham

(10) Patent No.: US 6,827,310 B1
(45) Date of Patent: Dec. 7, 2004

(54) APPARATUS AND METHOD FOR FIN ACTUATION IN A PORTABLE MISSILE

(75) Inventor: Kent Whitham, Inyokern, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/668,126

(22) Filed: Sep. 22, 2003

(51) Int. Cl.[7] .............................. F42B 10/64; B64C 5/06
(52) U.S. Cl. ..................... 244/3.24; 74/89.23; 74/89.42
(58) Field of Search ............................... 244/3.24, 3.25, 244/3.27, 3.29; 74/89.23, 89.42, 424.71; 192/141

(56) References Cited

U.S. PATENT DOCUMENTS 4,795,110 A * 1/1989 Lang ......................... 244/3.24
5,249,761 A * 10/1993 Schroppel ................... 244/3.21
6,311,576 B1 * 11/2001 Pletschet ........................ 74/441

FOREIGN PATENT DOCUMENTS

JP        2-217799      * 8/1990   ........... F42B/10/64

* cited by examiner

Primary Examiner—Robert P. Swiatek
(74) Attorney, Agent, or Firm—Laura R. Foster

(57) ABSTRACT

A fin actuator for a portable missile and a method of using the same. One aspect of the present invention includes a fin or wing actuator that meets very strict criteria to fit within a compact, portable missile while substantially limiting backlash. Another aspect of the present invention is a method of fin actuation in a portable missile while substantially limiting backlash.

26 Claims, 1 Drawing Sheet

APPARATUS AND METHOD FOR FIN ACTUATION IN A PORTABLE MISSILE

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The present invention relates generally to flight control actuators and more specifically, to fin actuators that substantially limit backlash in portable missiles while meeting strict construction constraints.

BACKGROUND OF THE INVENTION

In today's conflict scenarios the warfighter must be versatile and on the move. More often munitions and weapons are required to be man packable and portable. Funds for warfighting are stretched to their fullest, adding the requirement of lower unit cost. One alternative that meets these requirements includes a man packable, portable, and economical shoulder launched missile. In order to be man portable the missile must be lightweight and compact.

One specific area of concern in the construction of a portable missile is the operation of the fins or wings. Missile control fins are commonly positioned by actuators mounted within the missile body in an actuator section. The actuator exerts appropriate rotational torque and control on the fin in response to commands from the guidance control system to maneuver the missile. In a portable missile, there exists for a fin actuator stringent requirements of size, weight, torque and angle of deflection delivered to the fin shaft, backlash, cost, and ease of construction. The small body diameter requirement intensifies the mechanical problem of converting rotary motion from a motor into torque to be applied to a fin shaft. In addition, all of the missile components must withstand great temperature variations due to their shipment and use in many different climates.

Total backlash refers to the additive "slop" or "play" that exists between the mating components in a fin actuator, measured as a total angular value at the fin shaft as the fin or wing rotates about its axis. The various backlash values of the components contribute to the overall total backlash. Friction between components and thermal expansion contribute to total backlash. An excessive amount of backlash in the fins or wings creates a situation in which directional control of the missile is much more complicated for the guidance control system.

Many types of conventional fin actuators were examined to meet the fin actuator requirements. A worm gear drive small enough to meet the demands of the missile would require custom manufacture of the gears, and since there is inadequate room to fully support the worm gear a large amount of friction would result. It would be difficult (costly) to manufacture a worm gear to meet the physical space requirements. A bevel or miter gear actuator must be set, preloaded and shimmed to maintain the proper clearances. Also, gears are subject to expansion and contraction with temperature, contributing to backlash. In a production environment, positioning gears to achieve correct spacing is difficult, contributing to the cost. Custom fabrication and assembly would be required for this type of actuator, thereby exceeding the cost and ease of fabrication requirements. The use of a stepper motor linear actuator was also precluded due to the dimensions of the motor. In addition, these drives do not accommodate significant side loads that can be generated while in flight. Hydraulic type actuators also exceeded the physical space requirements. In general, the final result in the actuators considered was an excessive amount of backlash, along with difficulty meeting size and weight parameters.

Therefore it would be desirable to provide a fin or wing actuator that will meet the specific requirements previously discussed for a low cost, man-portable missile.

SUMMARY OF THE INVENTION

The present invention relates to a novel fin actuator for a portable missile and a method of using the same. One aspect of the present invention includes a fin or wing actuator that meets very strict criteria to fit within a compact, portable missile while substantially limiting backlash. Another aspect of the present invention is a method of fin actuation in a portable missile while substantially limiting backlash.

In an embodiment of the present invention a fin actuator (s) in a portable missile that substantially limits backlash includes a means for rotating a power shaft operatively configured to rotate the power shaft in a forward direction and a reverse direction; a means for converting the rotational movement of the power shaft to linear movement, including a lead screw fixedly coupled to the power shaft with a lead nut threadingly engaged and moving linearly along the lead screw in relation to the direction of rotation of the power shaft; and a means for converting the linear movement of the lead nut to rotational movement of a fin shaft, including the lead nut operatively coupled to a crank arm fixedly coupled to the fin shaft, effecting the rotation of the fin shaft according to the linear movement of the lead nut.

Another aspect of the present invention includes a method for fin actuation, in a portable missile, that substantially limits backlash. An example of the method includes but is not limited to, providing a means operatively configured for rotating a power shaft in a forward direction and a reverse direction, providing a means for converting rotational movement of the power shaft to linear movement via a lead screw fixedly coupled to the power shaft and having a lead nut threadingly engaged moving linearly along the lead screw in relation to the direction of rotation of the power shaft, and providing a means for converting the linear movement to rotational movement of a fin shaft, including operatively coupling the lead nut to a crank arm that is fixedly coupled to the fin shaft, effecting the rotation of the fin shaft according to the linear movement of the lead nut.

In an embodiment of the present invention the lead screw, lead nut, and crank arm are so constructed and coupled as to limit the total backlash of the actuator(s), measured at the fin shaft, to less than about 0.1 degrees. In additional embodiments of the present invention the actuator(s) is dimensioned and configured to fit in a portable missile of less than about 5 lbs, of less than about 2 inches in diameter, and/or of less than about 3 inches in length. In additional embodiments of the present invention the actuator(s) is providing at least about 50 oz-in of torque to the fin shaft and/or providing from at least about −20 degrees to at least about +20 degrees of deflection of the fin shaft. In another embodiment of the present invention the actuator(s) includes the crank arm and the fin shaft combined as a unitary structure. It is noteworthy that multiple embodiments of the present invention shall be used to operate multiple fins on a portable missile.

It is to be understood that the foregoing general description and the following detailed description are exemplary and explanatory only and are not to be viewed as being restrictive of the present invention, as claimed. These and other objects, features and advantages of the present invention will become apparent after a review of the following detailed description of the disclosed embodiments and the appended claims.

DESCRIPTION OF THE PREFERRED EMBODIMENTS

Figure 1:
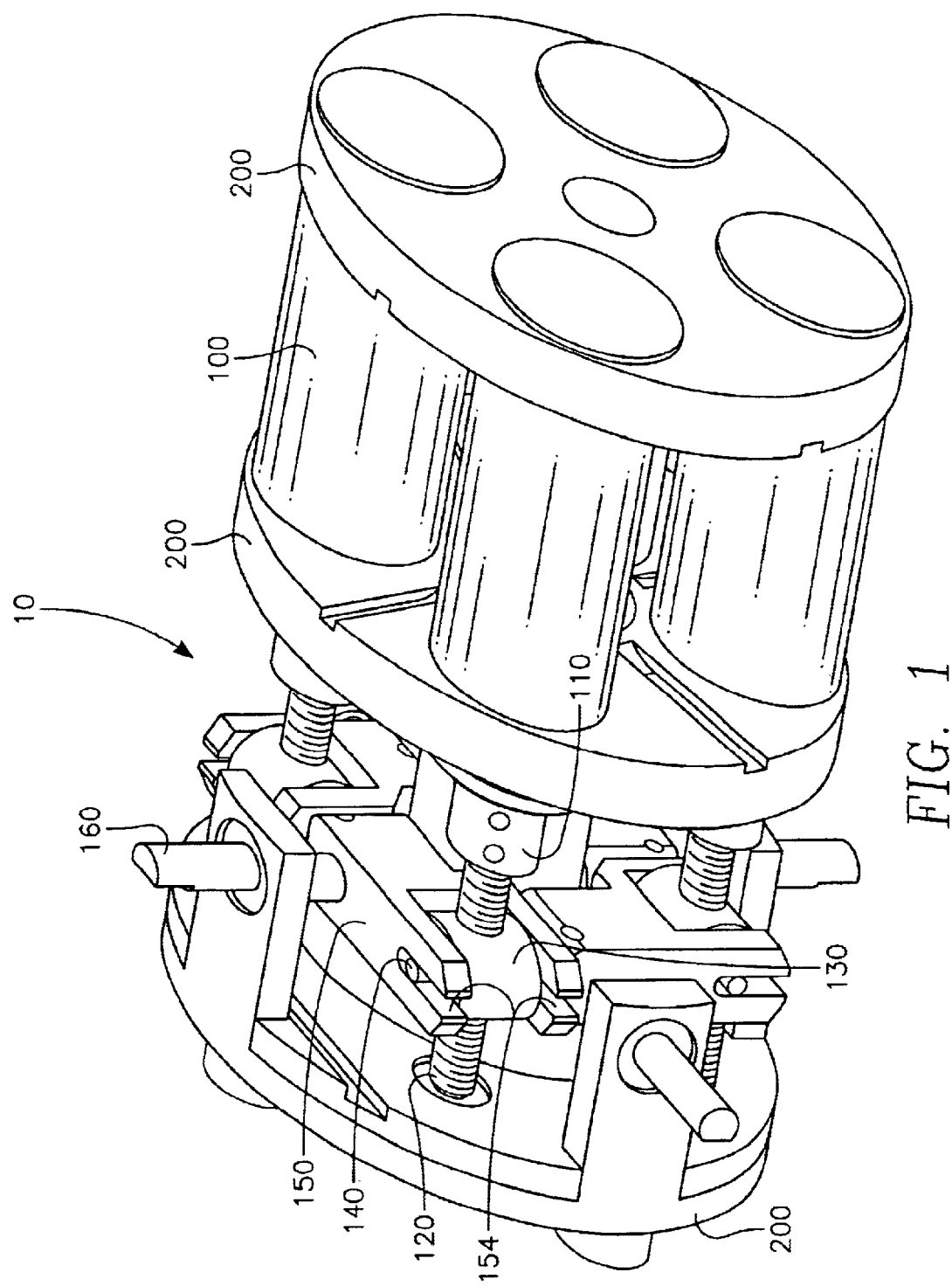
FIG. 1 is a perspective view of the fin actuation unit of a missile, including four fin actuators, according to an embodiment of the present invention

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

The present invention relates to a fin actuator for a portable missile and a method of using the same. One aspect of the present invention includes a fin or wing actuator that meets very strict criteria to fit within a compact, portable missile while substantially limiting backlash. Another aspect of the present invention is a method of fin actuation in a portable missile while substantially limiting backlash.

FIG. 1 illustrates a fin actuator section 10 of a portable missile including four fin actuators of an embodiment of the present invention. Although only three actuators are visible in FIG. 1, it will be appreciated that the actual number of actuators required for a specific missile will be in general evenly spaced around the circumference of the missile body, and that therefore the actuator section 10 in FIG. 1 includes a fourth actuator which is hidden from view. Hereinafter, for the sake of simplification, embodiments of one fin actuator of the present invention will be described. The description applies in corresponding manner to the other actuators illustrated. Each of the actuators operates as commanded by a guidance controller (not shown), to thereby rotate its corresponding fin, enabling the missile to maneuver. The guidance control system shall provide a command for rotation of the fin in accordance with known tracking/guidance systems.

The fin actuator section 10 has a means 100 operatively configured for rotating a power shaft (means for rotating), preferably a reversible electric motor, and a power shaft (not shown), that is the motor's output shaft. The means for rotating 100 is mounted in an actuator housing 200, thereby constraining the rotating means from free movement. The power shaft is fixed to a threaded lead screw 120, preferably by means of a set screw coupler 110. The lead screw 120 has a lead nut 130 that traverses along the lead screw in response to the rotation of the lead screw 120. The lead screw 120 is lubricated to enable the lead nut 130 to move smoothly. By rotating the lead screw 120 in forward and reverse directions the lead nut 130 moves in opposite linear directions along the length of the lead screw 120, thus converting the rotational movement of the power shaft to linear movement. The lead nut 130 is operatively coupled to a crank arm 150 having slots 154 in such a way as to allow it freedom of movement without substantially contributing to the total backlash. Preferably the lead nut 130 includes fixed pins 140 on each side (bottom pin not shown) which slide into the slots 154 of the crank arm 150. The pins 140 serve to both restrain the lead nut 130 in the crank arm 150, and as the structural component used to transfer the torque to the crank arm 150. The crank arm 150 turns in relation to the movement of the lead nut 130, thereby converting linear movement to the rotational movement of the fin shaft 160. The crank arm 150 is rigidly attached to the fin shaft 160 thereby the fin shaft 160 is rotated with the rotation of the crank arm 150, adjusting the fin (not shown) on the outside of the missile according to the guidance system.

Another aspect of the present invention includes a method for fin actuation, in a portable missile, that substantially limits backlash. An example of the method includes but is not limited to, providing a means operatively configured for rotating a power shaft in a forward direction and a reverse direction, providing a means for converting rotational movement of the power shaft to linear movement via a lead screw fixedly coupled to the power shaft and having a lead nut threadingly engaged moving linearly along the lead screw in relation to the direction of rotation of the power shaft, and providing a means for converting the linear movement to rotational movement of a fin shaft, including operatively coupling the lead nut to a crank arm that is fixedly coupled to the fin shaft, effecting the rotation of the fin shaft according to the linear movement of the lead nut.

Example Of An Embodiment Of The Present Invention

In a portable missile fin actuator there exists stringent requirements of size, weight, torque and angle of deflection delivered to the fin shaft, backlash, cost, and ease of construction. One example of a compact, man portable missile requires four fin actuators in its actuator section for maneuverability. It was necessary to construct the missile's fin actuators to meet the following parameters: about 0.1 degree of total backlash as measured at the fin shaft, about 50 ounce-inches (oz-in) torque delivered to the fin shaft, at least about +/−20 degrees of fin deflection, a maximum actuator section diameter of about 1.7 inches (in), a maximum actuator section length of about 3 inches (in), low cost and easy to assemble. The overall weight of the missile was limited to less than about 5 lbs. An extensive review of existing, available means was performed to find a means or method to achieve the requirements but none were found.

The requirements were met by an actuator of an embodiment of the present invention as described above. The power shaft consists of the motor output shaft of a reversible, brushless DC motor rated at 50 volts (specifically an API motor, model number B0508) with a feedback position sensor installed to note the position of the fin at any moment. This motor was selected because of its very low internal backlash and its torque output. The lead screw is attached to the motor output shaft by a two set screw coupler. The size of the lead screw is 3 mm in diameter with a 0.5 mm lead or pitch. The lead screw material is type 304 annealed stainless steel. The lead screw passes through a lead nut which travels linearly forward and back along the lead screw in response to the direction the lead screw is rotated by the motor. The lead nut material is SAE 660 bearing bronze. The thermal expansion characteristics of the lead screw and the lead nut are comparable, therefore the contribution to the total backlash due to thermal expansion was negligible. The lead screw and the lead nut were lubricated with a dry film lubricant that added a negligible amount of thickness to the surfaces allowing a very close fit of the parts and limiting total backlash. The lubricant used was Dicronite™ (meets military specification DOD-L-85645A type 1).

A crank arm is driven by the lead nut. The lead nut has 2 pins machined on each end which serves to transfer the motion and torque to the crank arm. The crank arm has slots which allow the pins to traverse the length of the arm as it goes through its rotational movement. The crank arm is rigidly attached to the fin shaft by means of a roll or spring pin. The fin shaft rotates with the crank arm.

It is noteworthy that the specific total backlash requirements were met by this actuator by constructing and coupling so as to provide for close tolerances of the parts, using the special lubricant, and selecting materials such as the bronze lead nut and the stainless steel lead screw. The softer bronze gives way to the stainless steel, acting as when there was more room between the threads or as when more lubrication was present without adding to the total backlash. It is also noteworthy that this actuator is constructed and coupled using parts that are readily assembled or repaired in the field when the need arises, as well as being easily assembled in a manufacturing situation.

There accordingly has been described a novel fin actuator and a method of fin actuation for a compact, portable missile meeting stringent requirements of size, weight, torque and angle of deflection delivered to the fin shaft, backlash, cost, and ease of construction. The present invention has the benefit of being simple to assemble as well as providing very close tolerances to meet the backlash requirement. The present invention allows for accurate assembly with minimal labor time or expertise. The present invention contributes to the success of the warfighter in today's conflict scenarios.

Although the description above contains much specificity, this should not be construed as limiting the scope of the invention but as merely providing an illustration of the presently preferred embodiment of the invention. Thus the scope of this invention should be determined by the appended claims and their legal equivalents.

What is claimed is:

1. A fin actuator, in a portable missile, that substantially limits backlash, comprising:
    means for rotating a power shaft, said means for rotating operatively configured to rotate said power shaft in a forward direction and a reverse direction, said means for rotating being constrained from free movement by an actuator housing;
    means for converting rotational movement of said power shaft to linear movement, wherein said means for converting rotational movement of said power shaft includes a lead screw fixedly coupled to said power shaft, said lead screw having a lead nut threadingly engaged and moving linearly along said lead screw in relation to the direction of rotation of said power shaft; and
    means for converting said linear movement of said lead nut to rotational movement of a fin shaft, wherein said means for converting said linear movement includes said lead nut operatively coupled to a crank arm including slots to allow freedom of movement, said crank arm fixedly coupled to said fin shaft, effecting the rotation of said fin shaft according to the linear movement of said lead nut.

2. The actuator of claim 1, wherein said means for rotating a power shaft comprises a reversible electric motor.

3. The actuator of claim 1, wherein said lead screw, said lead nut, and said crank arm are so constructed and coupled as to limit the total backlash of said actuator measured at said fin shaft to less than about 0.1 degrees.

4. The actuator of claim 1, wherein said actuator is dimensioned and configured to fit in said portable missile of less than about 5 lbs.

5. The actuator of claim 1, wherein said actuator is dimensioned and configured to fit in an actuator section of said portable missile of less than about 2 inches in diameter.

6. The actuator of claim 1, wherein said actuator is dimensioned and configured to fit in an actuator section of said portable missile of less than about 3 inches in length.

7. The actuator of claim 1, wherein said actuator is dimensioned and configured to provide at least about 50 oz-in of torque to said fin shaft.

8. The actuator of claim 1, wherein said actuator is dimensioned and configured to provide from at least about −20 degrees to at least about +20 degrees of deflection of said fin shaft.

9. The actuator of claim 1, wherein said crank arm and said fin shaft are a unitary structure.

10. A method for fin actuation, in a portable missile, that substantially limits backlash, comprising:
    providing a means for rotating a power shaft, said means for rotating operatively configured to rotate said power shaft in a forward direction and a reverse direction, said means for rotating being constrained from free movement by an actuator housing;
    providing a means for converting rotational movement of said power shaft to linear movement, wherein said means for converting rotational movement of said power shaft includes a lead screw fixedly coupled to said power shaft, said lead screw having a lead nut threadingly engaged and moving linearly along said lead screw in relation to the direction of rotation of said power shaft; and
    providing a means for converting said linear movement of said lead nut to rotational movement of a fin shaft, wherein said means for converting said linear movement includes said lead nut operatively coupled to a crank arm including slots to allow freedom of movement, said crank arm fixedly coupled to said fin shaft, effecting the rotation of said fin shaft according to the linear movement of said lead nut.

11. The method of claim 10, wherein said means for rotating a power shaft comprises a reversible electric motor.

12. The method of claim 10, wherein said lead screw, said lead nut, and said crank arm are so constructed and coupled as to limit the total backlash measured at the fin shaft to less than about 0.1 degrees.

13. The method of claim 10, wherein said fin actuation occurs within a portable missile of less than about 5 lbs.

14. The method of claim 10, wherein said fin actuation(s) occurs within an actuator section of said portable missile of less than about 2 inches in diameter.

15. The method of claim 10, wherein said fin actuation occurs within an actuator section of said portable missile of less than about 3 inches in length.

16. The method of claim 10, wherein said fin actuation provides at least about 50 oz-in of torque to said fin shaft.

17. The method of claim 10, wherein said fin actuation provides from at least about −20 degrees to at least about +20 degrees of deflection of said fin shaft.

18. The method of claim 10, wherein said crank arm and said fin shaft are a unitary structure.

19. A fin actuator, in a portable missile, that substantially limits backlash, comprising:
    a reversible electric motor for rotating a power shaft, said power shaft extending from said motor; said motor being constrained from free movement by an actuator housing;
    a lead screw fixedly coupled to said power shaft, said lead screw having a lead nut threadingly engaged and moving linearly along said lead screw in relation to the direction of rotation of said power shaft; and said lead nut operatively coupled to a crank arm including slots to allow freedom of movement, said crank arm fixedly coupled to a fin shaft, effecting the rotation of said fin shaft according to the linear movement of said lead nut.

20. The actuator of claim 19, wherein said lead screw, said lead nut, and said crank arm are so constructed and coupled as to limit the total backlash of said actuator measured at said fin shaft to less than about 0.1 degrees.

21. The actuator of claim 19, wherein said actuator is dimensioned and configured to fit in said portable missile of less than about 5 lbs.

22. The actuator of claim 19, wherein said actuator is dimensioned and configured to fit in an actuator section of said portable missile of less than about 2 inches in diameter.

23. The actuator of claim 19, wherein said actuator is dimensioned and configured to fit in an actuator section of said portable missile of less than about 3 inches in length.

24. The actuator of claim 19, wherein said actuator is dimensioned and configured to provide at least about 50 oz-in of torque to said fin shaft.

25. The actuator of claim 19, wherein said actuator(s) is dimensioned and configured to provide from at least about −20 degrees to at least about +20 degrees of deflection of said fin shaft.

26. The actuator of claim 19, wherein said crank arm and said fin shaft are a unitary structure.

\* \* \* \* \*